(12) United States Patent
Kang et al.

(10) Patent No.: US 7,096,352 B2
(45) Date of Patent: Aug. 22, 2006

(54) SECURITY PROTOCOL STRUCTURE IN APPLICATION LAYER

(75) Inventors: Kyoung Jin Kang, Namyangju (KR); Ji Won Yu, Inchon (KR); Jae Hwon Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 806 days.

(21) Appl. No.: 09/750,921

(22) Filed: Jan. 2, 2001

(65) Prior Publication Data
US 2001/0016907 A1    Aug. 23, 2001

(51) Int. Cl.
| | |
|---|---|
| H04L 9/00 | (2006.01) |
| H04L 9/30 | (2006.01) |
| H04K 1/00 | (2006.01) |
| G06F 9/00 | (2006.01) |
| G06F 15/16 | (2006.01) |
| G06F 17/00 | (2006.01) |

(52) U.S. Cl. .................. 713/152; 713/151; 713/169; 713/170; 713/171; 380/270; 380/44; 380/30; 726/14; 709/227; 709/228; 709/230

(58) Field of Classification Search ........ 380/281–285, 380/24–25, 48–49, 270; 713/151–152, 200–202, 713/182, 160, 169–171; 726/14; 709/227–230
See application file for complete search history.

(56) References Cited

U.S. PATENT DOCUMENTS

| | | | | |
|---|---|---|---|---|
| 5,535,276 | A | * | 7/1996 | Ganesan ................. 713/155 |
| 5,657,390 | A | * | 8/1997 | Elgamal et al. ........... 713/151 |
| 6,182,220 | B1 | * | 1/2001 | Chen et al. ............... 713/182 |
| 6,654,806 | B1 | * | 11/2003 | Wall et al. ................ 709/225 |
| 6,694,431 | B1 | * | 2/2004 | Binding et al. ........... 713/160 |

OTHER PUBLICATIONS

WAP Wireless Communication (WAP—Wireless Protocol Dircetory: WTLS/WTP/WSP, Nov. 1999).*

* cited by examiner

*Primary Examiner*—Christopher Revak
*Assistant Examiner*—Longbit Chai
(74) *Attorney, Agent, or Firm*—Fleshner & Kim, LLP

(57) ABSTRACT

A security protocol structure for a Wireless Application Protocol (WAP) standard structure is disclosed. The security protocol structure provides a data security function in an application layer by providing a secret session having a secured session layer security (SSLS) protocol for providing a secret session interface to an application program between the session layer and the application layer.

14 Claims, 4 Drawing Sheets

SECURITY PROTOCOL STRUCTURE IN APPLICATION LAYER

BACKGROUND OF THE INVENTION

1. Field of the Invention

The present invention relates to a Wireless Application Protocol (WAP), and more particularly, to a security protocol structure for providing an effective security function in an application layer.

2. Background of the Related Art

A Wireless Application Protocol (WAP) is a communication protocol for effectively using contents, such as the internet, from a wireless terminal, such as a mobile telephone. The WAP is a standard protocol for executing value-added communication services by using a mobile communication network by a mobile communication service provider, information provider, and terminal manufacturer, and was established by Erickson, Motorola, Nokia, Unwire Planet, etc. in June, 1997.

The security for data transmitted using the WAP standard is, as illustrated in FIG. 1, provided only in a Wireless Transport Layer Security (WTLS) 23. The WTLS is the next layer up from a Wireless Datagram Protocol (WDP) 22, which is a transport layer 12.

The WTLS protocol is a security protocol based on a Transport Layer Security (TLS) Protocol that is the industry standard. The TLS is called as a Secured Socket Layer (SSL), which is optimized for a low bandwidth network having a relatively long time delay. The WTLS 23 provides the following functions.

First, the WTLS 23 has a data integrity function of verifying that data transmitted between a client (terminal) and a server has not been changed or corrupted.

Second, the WTLS 23 has a data security function of not allowing the contents of data transmitted between a client and a server to be interpreted even if the data is intercepted.

Third, the WTLS 23 provides an authentication function between a client and a server.

FIG. 2 illustrates a handshake process in the WTLS protocol 23. As illustrated in FIG. 2, a client and a server agree upon algorithms and exchange random values by exchanging hello messages, and then exchange cryptographic parameters necessary to agree upon a pre-master secret. Then, the client and server generate a master secret from the random values exchanged using the pre-master secret, and thereafter provide security parameters to a record layer in a1 and b1. Thus, the client and server verify that they have computed the same security parameters, and the handshake is achieved without intervention of an intruder in c1 and d1.

The related art WTLS has various problems. For example, since the WTLS 23 provides data security at a layer right above the transport layer 12, it does not provide any data security in an application layer 16. Specifically, the current WAP standard does not define the functions of data integrity, data security, and user authentication at all. Hence, a specific unit must be defined in order to provide data security in the application layer.

In addition, the memory capacity and/or a CPU processing power of the current terminal is inappropriate to deal with user authentication using a certificate or public/private key generation operation that the WTLS deals with, and the protocol format proposed by the WTLS is complicated. Thus, the overload in data generation and decryption can never be ignored.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a security protocol structure for providing a data security function in an application layer.

To achieve at least the above object in whole or in parts, in a WAP standard structure preferably consisting of a network layer, transport layer, security layer, transaction layer, session layer, and application layer, there is provided a security protocol structure in an application layer having a secret session layer between the session layer and the application layer in order to provide a data security function in the application layer, said secret session layer having a secured session layer security (SSLS) protocol for providing a secret session interface to an application program.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
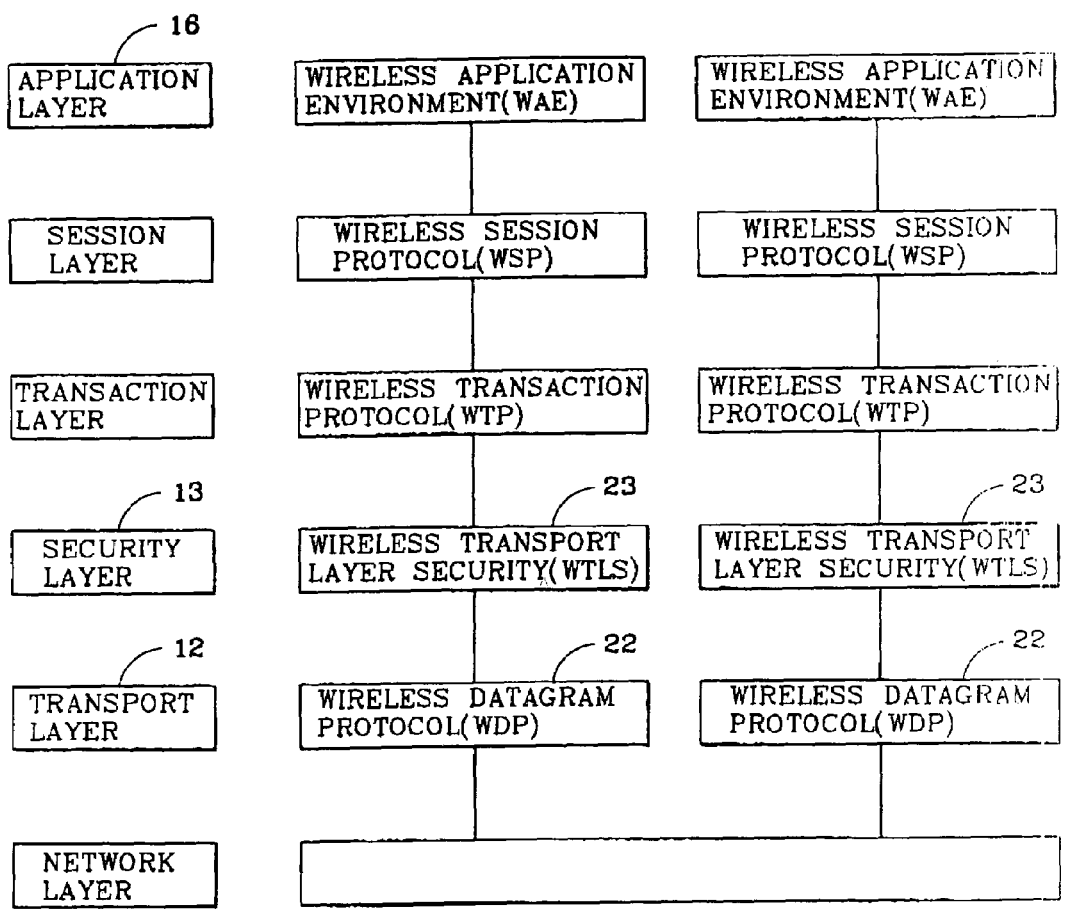
FIG. 1 is a drawing illustrating a related art security structure for data transmitted on the WAP standard.
Figure 2:
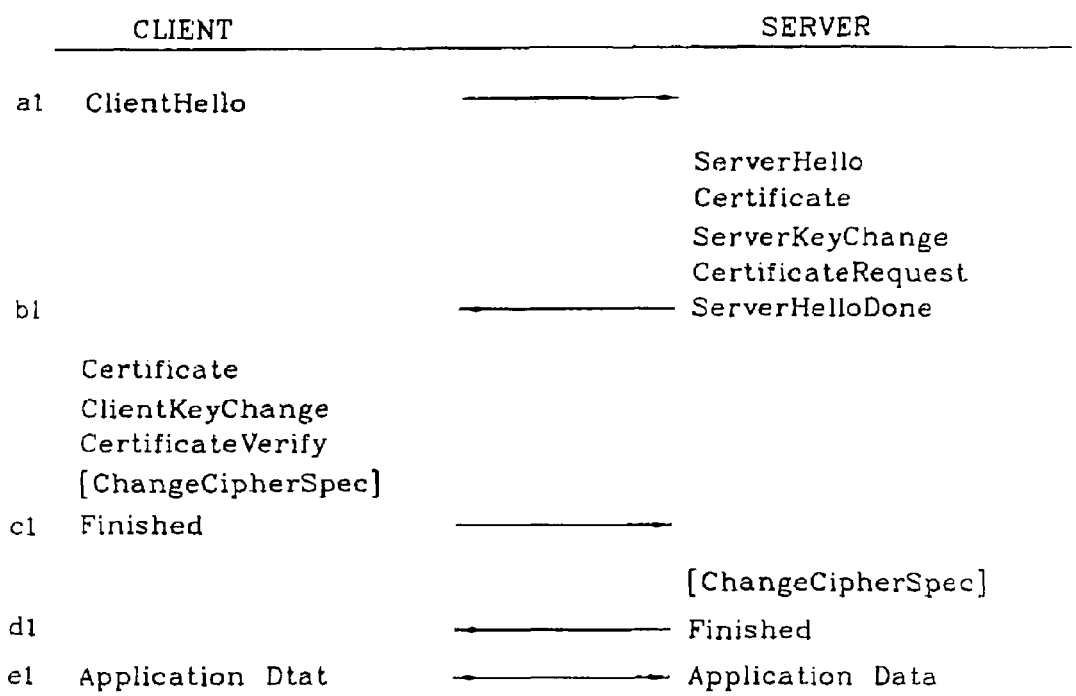
FIG. 2 is a drawing that illustrates a handshake process in a WTLS protocol.
Figure 3:
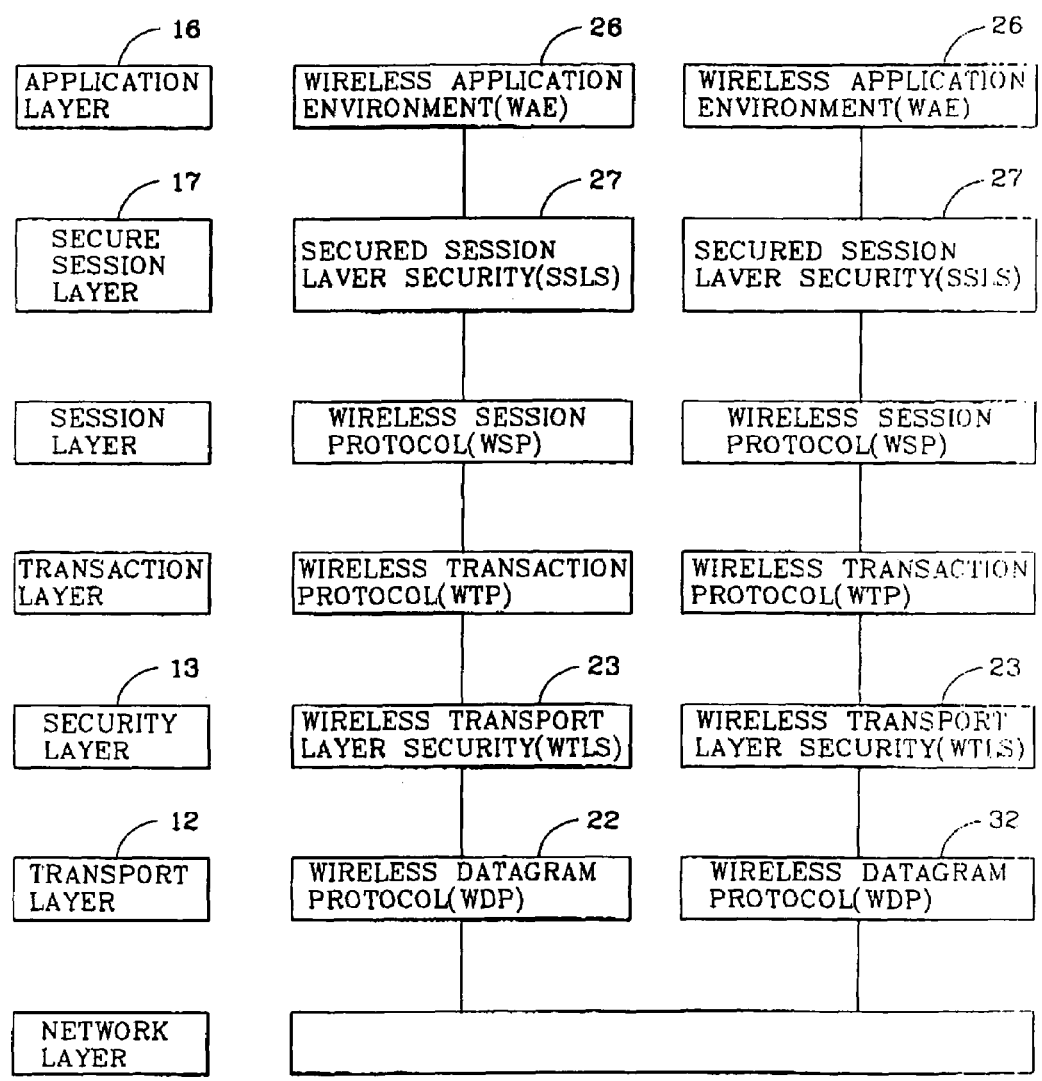
FIG. 3 is a security protocol structure in an application layer according to the preferred embodiment of the present invention.

Referring to FIG. 3, the security protocol according to the preferred embodiment of the present invention is named as a SSLS (Secured Session Layer Security) 27. The SSLS 27 preferably provides a data security function in an application layer 16, i.e., a secure session interface to an application program, while operating in a secure session layer 17. The SSLS protocol consists of a handshake scenario and a protocol data for use in handshake. Thus, in order to use the SSLS protocol, a server must preferably manage a user ID and its pre-master secret using a database, and a user must preferably input his or her ID and its pre-master secret in advance.

Figure 4:
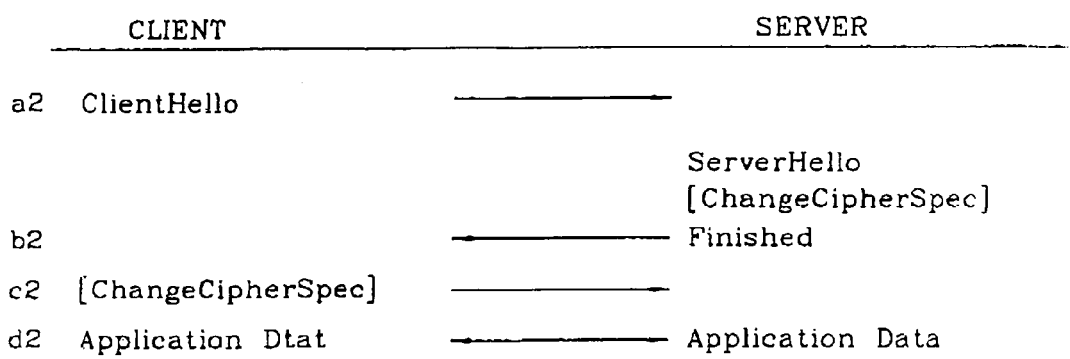
FIG. 4 is a drawing that illustrates a handshake process in a SSLS protocol.

FIG. 4 illustrates a handshake process in the SSLS protocol. At this time, a protocol data is described by using a protocol descriptive language used in the WTLS standard, and a PRF (Pseudo Random Function) also uses a function used in the WTLS standard as it is. In the SSLS protocol, a new secure session is based on a shared secret value stored by a client and a server, respectively. The shared secret value is preferably a pre-master secret.

First, the client transmits a ClientHello message to the server in a2. The ClientHello message preferably contains a client random value, for example, a user ID. The preferred message structure is as follows.

```
struct{
    unit32 gmt_unix_time;
    opaque random_bytes[12];
} Random;
Opaque Identifier <1..2^8-1>;
struct{
    unit8 client_version;
    Random random;
    Identifier client_id;
} ClientHello;
```

The server next checks to determine whether the user ID is valid upon receipt of the ClientHello message, and then extracts the pre-master secret from the user ID. This is made possible because the server manages the shared pre-master secret for the user ID in the database. The server generates a specific server random value, and generates a ServerHello message for transmitting the value to the client. The structure for the ServerHello message is as follows.

```
struct{
    unit8 server_version;
    Random random;
} ServerHello;
```

Subsequently, the server generates a master secret based on the extracted pre-master secret, client random, and server random values, and generates a key block based on the generated master secret, client random, and server random values. These values are described below.

```
master_secret = PRF(pre_master_secret, "master secret",
                ClientHello.random + ServerHello.random)[0...19];

Key block = PRF(master_secret, expansion_level)
            SecurityParameters.server_random +
            SecurityParameters.client_random;
```

Consequently, the last key value for use in encryption and decryption algorithms and MAC (message Authentication Code) algorithms is generated from the key block. The last key is preferably extracted from the key block in such a manner that a 16 byte client MAC key, 16 byte client encryption key, 8 byte client IV, 16 byte server MAC key, 16 byte server encryption key, and 8 byte server IV are sequentially allocated from the key block.

The server generates a ChangeCipherSpec record indicating that it will send encrypted messages beginning the next time. Thereafter, the server generates a Finished message verifying that the client generated the same master secret as the sever without transmitting an actual master secret in a network in b2. The Finished message is a first message transmitted from the record layer to the last encryption key and MAC key values generated by the server, and has the following structure.

```
struct{
    opaque verify_data[12];
} Finished;
```

Here, the verify_data is defined as follows.
verify_data=PFR(master_secret, "server Finished", H(handshake_messages))[0 . . . 11];

The handshake_messages is preferably the concatenation of the Client Hello and ServerHello messages.

In order to reduce the number of times of data exchange in the network, the Handshake record containing the ServerHello message generated by the server, the ChangeCipherSpec record, and the Handshake record containing the Finished message are preferably concatenated to be transmitted to the client at once.

The client processes the ServerHello message, and thereafter computes the master secret, key block, last encryption key, and MAC key values from the pre-master secret, client random, and server random values of its own in the same manner as the server.

The client subsequently processes the ChangeCipherSpec record transmitted from the server, and thereafter verifies that messages to be sent by the server will be encrypted, and verifies that it has generated the same master secret as the server by checking the Finished message. When the verification is finished, the client transmits the ChangeCipherSpec record indicating that the message to be sent by itself will be processed with an agreed upon key value in c2.

Therefore, the Handshake process in the SSLS protocol is successfully completed, and the data in the application layer is encrypted to thus be transmitted/received in d2.

The security protocol structure of the preferred embodiment has many advantages. For example, it can provide a data security function in the application layer not available in the related art WAP standard by providing a SSLS protocol structure operating in the secure session layer.

In addition, the preferred embodiment is applicable by the memory capacity and/or CPU processing power of the current terminal because the key generation/exchange is achieved using a simple hash operation based on a simple public key without dealing with a certificate or public/private key generation operation. In particular, since the use of the public key requires a password for a user, the present invention provides user authentication of a simple format as well as data security.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of establishing a security protocol structure in an application layer of a Wireless Application Protocol (WAP) standard, comprising:
    receiving a first message containing a client random value from a client;
    determining whether the first message is a valid message;
    extracting a pre-master secret from the first message;
    generating a specific server random value;
    generating and transmitting a second message to the client to pass the server random value to the client;
    generating a master secret in accordance with the extracted pre-master secret, client random value, and server random value;

generating a key block in accordance with the master secret, client random value, and server random value;

generating from the key block an encryption key value for encryption and decryption algorithms and Message Authentication Code (MAC) algorithms;

generating a third message indicating that encryption is activated; and generating a fourth message to verify that the client has generated a client master secret identical to the master secret and to indicate that secured communication has been established between a server generating the server random value and the client, wherein the security protocol structure comprises:

a secure session layer directly between a session layer including a wireless session protocol and an application layer including a wireless application environment;

a transaction layer including a wireless transaction protocol below the session layer;

a security layer including a wireless transport layer security below the transaction layer;

a transport layer including a wireless datagram protocol below the security layer; and a network layer below the transport layer, wherein the secure session layer provides a data security function in the application layer, and includes a secured session layer security (SSLS) protocol to provide a secure session interface to an application program, and wherein secure communication is established between a server and a client using the SSLS protocol and without using a certificate or public/private key generation operation.

2. The method of claim 1, wherein the client random value is a client ID.

3. The method of claim 2, wherein a subscriber inputs the client ID into a wireless communications device to establish secure communications with a server using the Wireless Application Protocol (WAP).

4. The method of claim 1, wherein the pre-master secret is a shared pre-master secret, and wherein the server manages the shared pre-master secret corresponding to the first message in a database.

5. The method of claim 4, wherein the first message is a user ID entered on a client terminal by a subscriber.

6. The method of claim 1, wherein the fourth message is a Finished message, and is transmitted from a record layer.

7. The method of claim 6, wherein the Finished message is transmitted using the encryption key and MAC key values, and indicates that encrypted communications have been established.

8. The method of claim 1, wherein the client computes values of the master secret, the key block, the encryption key, and the MAC key after receiving and processing the second message.

9. The method of claim 1, wherein the third message is a ChangeCipherSpec message.

10. The method of claim 1, wherein the encryption key is extracted from the key block in such a manner that a 16 byte client MAC key, 16 byte client encryption key, 8 byte client IV, 16 byte server MAC key, 16 byte server encryption key, and 8 byte server IV are sequentially allocated from the key block.

11. The method of claim 1, wherein the first message and the second message comprise a Handshake message.

12. The method of claim 11, wherein the Handshake message is formed by concatenating the first message and the second message.

13. The method of claim 1, wherein the second message is a ServerHello message, the third message is a ChangeCipherSpec message, and the fourth message is a Finished message, and wherein the second, third, and fourth messages are concatenated together to be transmitted to the client.

14. The method of claim 1, wherein the client verifies that encryption is activated after receiving and processing the third message.

* * * * *